UNITED STATES PATENT OFFICE.

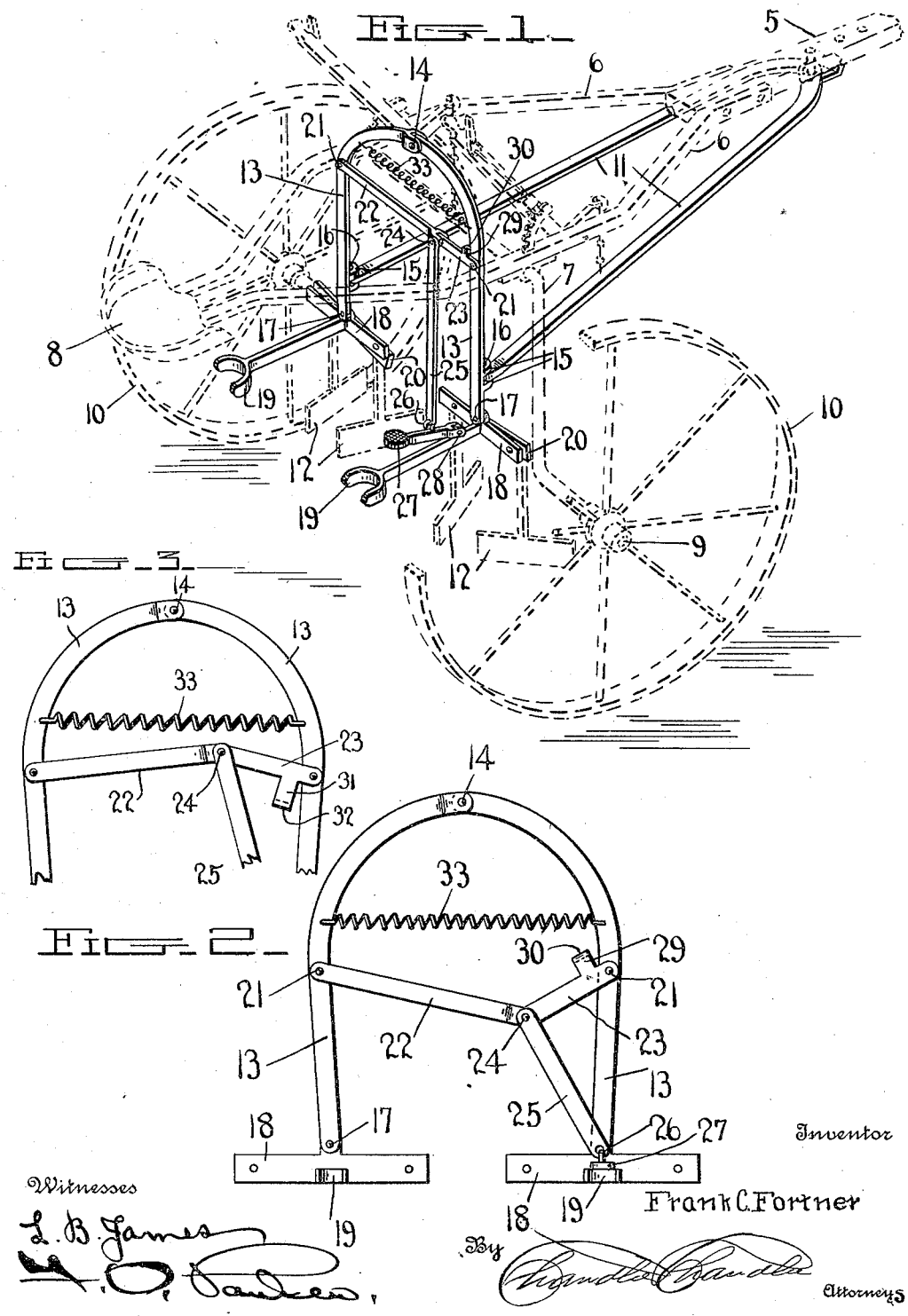

FRANK C. FORTNER, OF FINDLAY, ILLINOIS.

ADJUSTABLE CULTIVATOR-ARCH.

997,797.　　　　　Specification of Letters Patent.　　Patented July 11, 1911.

Application filed February 28, 1910. Serial No. 546,389.

*To all whom it may concern:*

Be it known that I, FRANK C. FORTNER, a citizen of the United States, residing at Findlay, in the county of Shelby, State of Illinois, have invented certain new and useful Improvements in Adjustable Cultivator-Arches; and I do hereby declare the following to be a full, clear, and exact description of the invention, such as will enable others skilled in the art to which it appertains to make and use the same.

The invention relates to an attachment for cultivators and more particularly to the class of adjustable yokes or arches for riding cultivators.

The primary object of the invention is the provision of an attachment of this character in which the cultivator beams of a riding cultivator may be readily and easily adjusted toward and away from each other so as to change the distance between the beams while the cultivator is in operation.

Another object of the invention is the provision of an attachment of this character in which an operator riding the cultivator may manipulate his foot to raise or lower the cultivator beam and effect the changing of the distance between the said beams while the cultivator is in operation.

A further object of the invention is the provision of an attachment of this character which may be mounted upon various forms of riding cultivators and that is simple in construction, thoroughly reliable and efficient in operation, and inexpensive in the manufacture.

With these and other objects in view the invention consists in the construction, combination, and arrangement of parts, as will be hereinafter more fully described, illustrated in the accompanying drawings which disclose the preferred forms of embodiment of the invention, to enable those skilled in the art to carry the invention into practice, and as pointed out in the claims hereunto appended.

In the drawings:—Figure 1 is a perspective view of the invention as applied to a riding cultivator, the latter being shown in dotted lines. Fig. 2 is a plan view of the invention, the same being shown in adjusted position. Fig. 3 is a fragmentary view of a slightly modified form of the invention.

Similar reference characters indicate corresponding parts throughout the several views in the drawings.

In the drawings, there is shown a riding cultivator embodying the usual central draft beam 5, having secured near its rearmost end on opposite sides thereof rearwardly diverging side bars 6, forming a frame which latter also has connection with an arched axle 7, and supports the ordinary riding seat 8, and upon this axle at its journal end 9, are mounted the usual rotatable ground wheels 10, which enables the cultivator to be drawn through a field.

Suitably connected to the central draft beam 5, are downwardly and rearwardly extending cultivator beams 11, which latter are capable of swinging movement and to these beams are connected the ordinary cultivator blades 12, the same being adapted to cultivate the ground on opposite sides of a row of growing plants when the machine is advanced through a field.

The arch attachment comprises legs or members 13, which latter are connected at their upper ends by a pivot 14, to permit them to be swung toward or away from each other. Near the lower extremities of these legs or members 13, are formed spaced ears 15, between which are loosely connected by pivots 16, the rearmost ends of the cultivator beams 11.

To the ends of the respective members or legs 13, transverse plates 18 are centrally connected by means of pivots 17, which plates have formed integrally therewith centrally of the stirrups rearwardly extending foot stirrups 19, the same being adapted to be engaged by the feet of the rider in the usual ordinary manner. Also pivoted to these plates 18 are bars 20, the same carrying the cultivator blades 12, the same being adapted to cultivate the ground on opposite sides of a row of growing plants when the machine is advanced through a field.

Connected to the respective members or legs 13, by pivots 21 are the outer ends of long and short links 22 and 23 the adjacent ends of which are connected by a pivot 24, and to this pivot is also connected a rearwardly inclined bar 25, the same being loosely connected as at 26, to a foot treadle 27, which is connected by a pivot 28 to one of the stirrups 19, and this foot treadle is operated in a manner as will be hereinafter more fully described.

Formed on the short link 23, and rising therefrom is a stop lug or extension 29, having a right angular terminal 30, to contact with one of the legs or members 13, to limit the spreading movement of the legs in a manner as will be hereinafter described.

The stirrups 19, are adapted to be engaged by the feet of a rider of a machine and upon a rider depressing by the toe of one foot the treadle 27, the links 22 and 23 will become broken at their point of pivotal connection 24, and in this manner by the pulling exertion of the bar 25, the said legs or members 13 will be caused to move toward each other thereby bringing the cultivator beams 11, in close relation to each other.

In Fig. 3 there is shown a slight modification of the arch attachment wherein the short link 23, is formed with a depending stop lug or ear 31, having a right angular terminal 32, adapted to contact or abut against one of the legs or members 13, of the arch so that when a rider of the cultivator presses upwardly on the foot treadle 19, by his foot the cultivator beams 11, will be moved toward each other but should it be desired to spread the said beams it is only necessary for the operator to depress the foot treadle 19, which will bring the links 22 and 23, into alinement with each other and in this manner the said cultivator beams 11, will be spread apart. Connected to the legs or members 13, of the attachment and spanning the space between them is a retractile spring 33, which latter serves to normally hold the stop lugs in both forms of the attachment in contact with one of the legs or members 13, thereof.

What is claimed is:—

1. The combination with a cultivator having vertically and horizontally swinging cultivator beams, of a two-part pivotal arch mounted upon the cultivator beams between their connections for swinging movement, a toggle connection between the two parts of the arch and a connection between the toggle connection and one of the beams to effect the breaking of the toggle connection upon movement of either of the beams for changing the distance between said beams.

2. The combination with a cultivator having swinging cultivator beams, of a two-part pivotal arch mounted upon the cultivator beams between their connections for swinging movement, a toggle connection between the two parts of the arch and a connection between the toggle connection and one of the beams to effect the breaking of the toggle connection upon vertical movement of either of the beams for changing the distance between said beams, and means limiting the movement of the beams.

3. In combination with a cultivator having swinging cultivator beams, curved legs pivoted to the rear ends of the cultivator beams and to each other, a long link pivoted to one of the curved legs, a short link pivoted to the other curved leg and provided with a stop adapted to engage said leg, the inner ends of the links being pivoted to each other, a depending bar pivoted to the links, a treadle pivoted to the depending bar and a spring connected at its ends to the legs.

In testimony whereof, I affix my signature, in presence of two witnesses.

FRANK C. FORTNER.

Witnesses:
RAYMOND PHILLIPS,
W. J. CAMPBELL.

---

Copies of this patent may be obtained for five cents each, by addressing the "Commissioner of Patents, Washington, D. C."